(12) United States Patent
Anzola

(10) Patent No.: US 10,233,059 B1
(45) Date of Patent: Mar. 19, 2019

(54) CRANE MAT SYSTEM AND METHOD

(71) Applicant: GREENFIELD PRODUCTS, LLC, Hazel Crest, IL (US)

(72) Inventor: Gustavo A. Anzola, Cumming, GA (US)

(73) Assignee: Greenfield Products, LLC, Hazel Crest, IL (US)

(*) Notice: Subject to any disclaimer, the term of this patent is extended or adjusted under 35 U.S.C. 154(b) by 0 days.

(21) Appl. No.: 15/705,791

(22) Filed: Sep. 15, 2017

(51) Int. Cl.
| A47B 91/00 | (2006.01) |
| B66C 23/78 | (2006.01) |
| E02D 27/44 | (2006.01) |
| F16M 5/00 | (2006.01) |

(52) U.S. Cl.
CPC .............. B66C 23/78 (2013.01); E02D 27/44 (2013.01); F16M 5/00 (2013.01); *E02D 2220/00* (2013.01); *F16M 2200/08* (2013.01)

(58) Field of Classification Search
CPC .................................. B60P 7/12; B60P 7/0815
See application file for complete search history.

(56) References Cited

U.S. PATENT DOCUMENTS

| 3,312,181 | A | * | 4/1967 | Davidson .............. B60P 7/0815 |
| | | | | 206/597 |
| 3,754,777 | A | | 8/1973 | Riggs et al. |
| 3,831,774 | A | | 8/1974 | Moore |
| 3,930,668 | A | | 1/1976 | Schuermann et al. |
| 3,945,666 | A | | 3/1976 | Fritsch |
| 4,073,454 | A | | 2/1978 | Sauber |
| 4,132,310 | A | * | 1/1979 | Dorsch ..................... B60P 7/12 |
| | | | | 206/386 |
| 4,189,125 | A | | 2/1980 | Little |
| 4,266,809 | A | | 5/1981 | Wuerflein |
| D282,241 | S | | 1/1986 | Sauber |
| 5,419,524 | A | | 5/1995 | Evans et al. |
| 7,073,821 | B2 | | 7/2006 | Lagsdin |
| 7,172,216 | B1 | | 2/2007 | Lagsdin |
| 8,454,285 | B2 | * | 6/2013 | Jackson ............. B65D 71/0088 |
| | | | | 410/96 |
| 8,814,121 | B2 | | 8/2014 | Koberg |
| 9,038,835 | B2 | | 5/2015 | Oliver et al. |
| 9,254,821 | B2 | | 2/2016 | Koberg |
| 9,447,643 | B2 | | 9/2016 | Jack et al. |
| 9,550,657 | B2 | | 1/2017 | Koberg |

(Continued)

FOREIGN PATENT DOCUMENTS

| WO | WO 03/064239 | 8/2003 |
| WO | WO 2014/047813 | 4/2014 |
| WO | WO 2016/079489 | 5/2016 |

*Primary Examiner* — Amy J. Sterling
(74) *Attorney, Agent, or Firm* — McCracken & Gillen LLC

(57) ABSTRACT

A crane mat system includes a top surface and a bottom surface constructed of steel plates. The top surface and the bottom surface are joined by one or more sides and an internal support structure. Two or more lifting portions are mounted to recessed walls. Each lifting portion includes an arm having a proximal end attached to a recessed wall of the mat and a distal end attached to a plate. Each arm is mounted above the midline of the height of the mat. A protrusion is mounted on each arm such that when the mats are stacked, the protrusions over lower mats are nested within recessed cutouts of upper mats. The lifting portions are configured such that a sling can lift a stack of mats.

15 Claims, 8 Drawing Sheets

(56) References Cited

U.S. PATENT DOCUMENTS

| | | | |
|---|---|---|---|
| 2002/0048155 A1* | 4/2002 | Chiang | ................ G06F 1/1616 |
| | | | 361/747 |
| 2004/0046378 A1 | 3/2004 | Lagsdin | |
| 2005/0017223 A1 | 1/2005 | Lucas | |
| 2009/0072525 A1 | 3/2009 | Banks | |
| 2011/0233363 A1 | 9/2011 | Wold | |
| 2013/0213920 A1 | 8/2013 | Oliver et al. | |
| 2014/0091189 A1 | 4/2014 | Koberg | |
| 2014/0319315 A1 | 10/2014 | Koberg | |
| 2015/0083888 A1 | 3/2015 | Krawchuk et al. | |

* cited by examiner

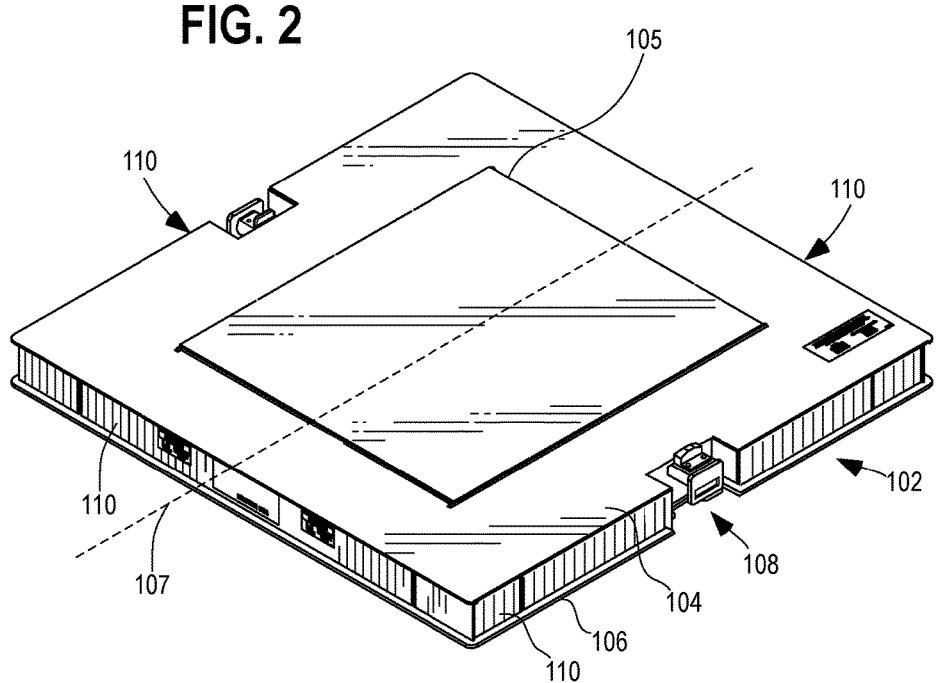
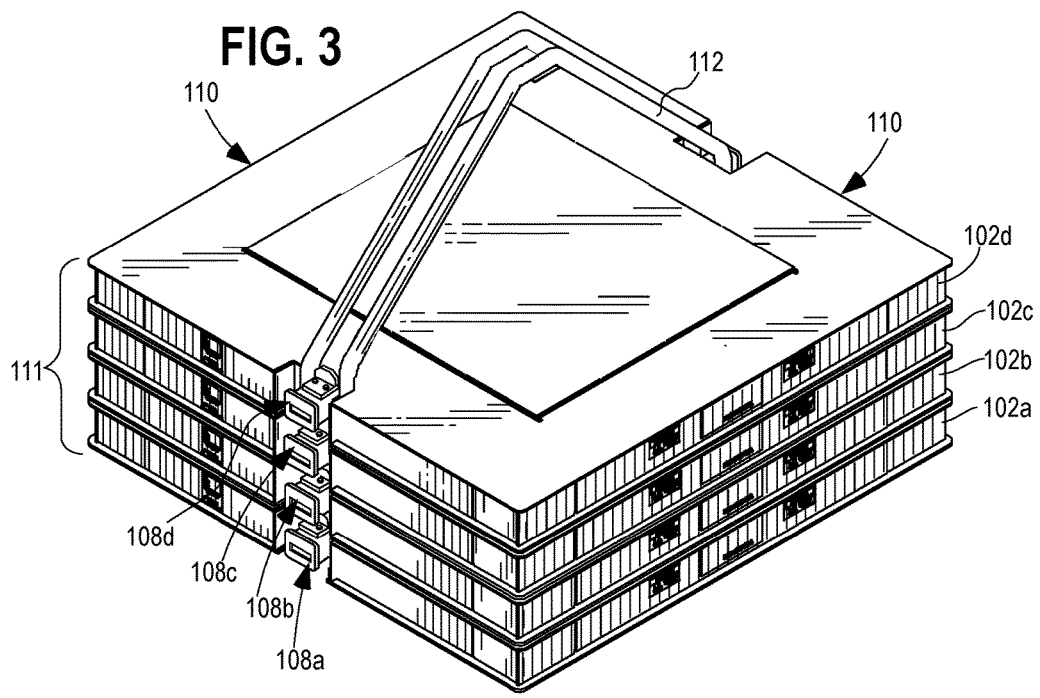

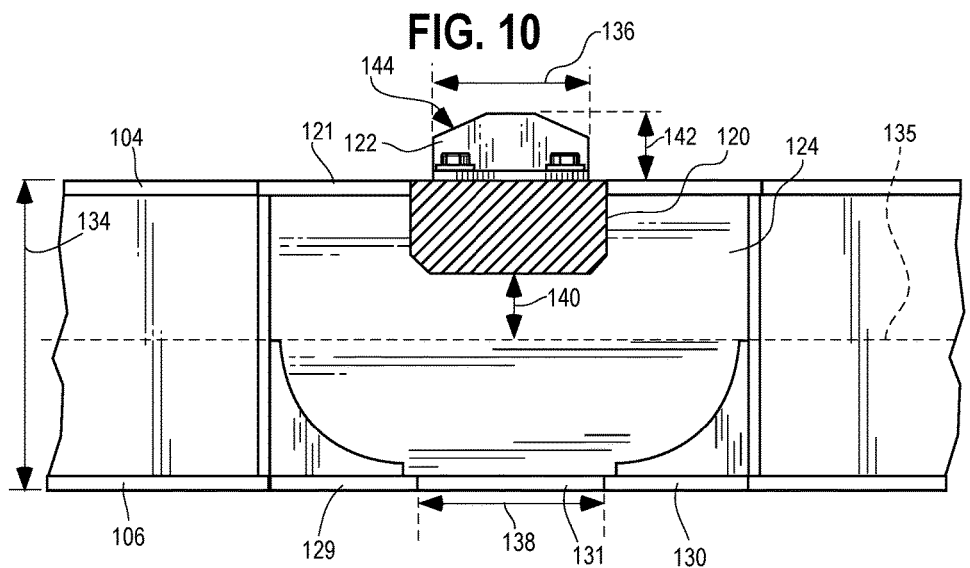
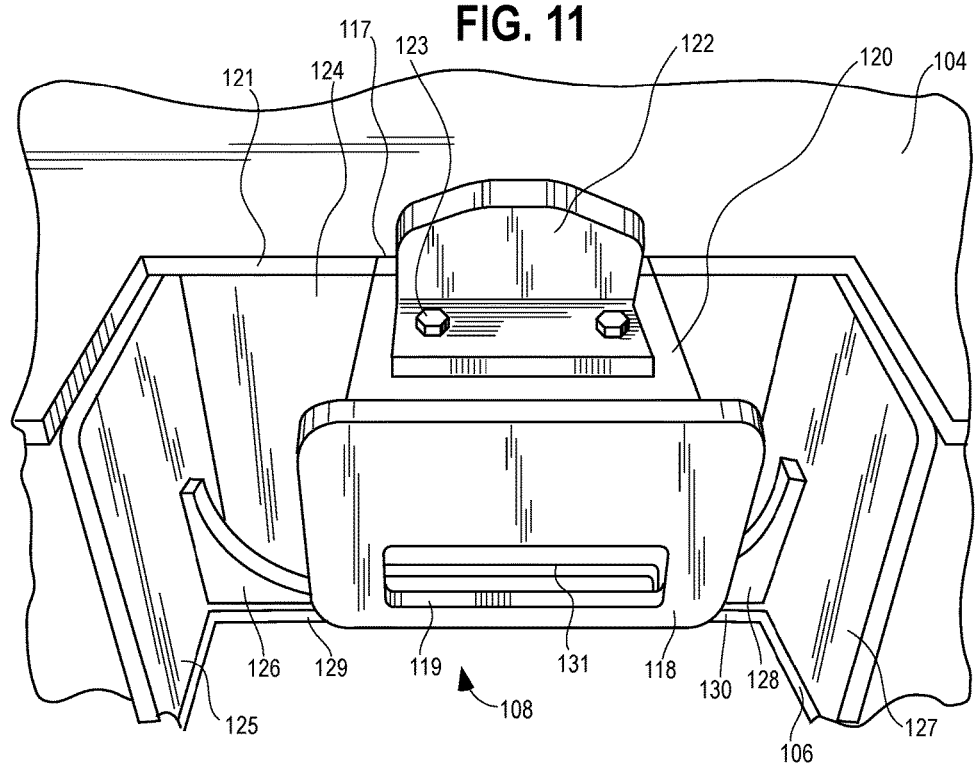

US 10,233,059 B1

CRANE MAT SYSTEM AND METHOD

FIELD OF THE DISCLOSURE

The present subject matter generally relates to outrigger mats used to support lifting systems used in connection with cranes, construction equipment, utility trucks, or other overhead lifting vehicles and, more particularly to lifting systems used to acquire loads.

BACKGROUND

Outrigger mats are used in a variety of settings, and particularly to provide a stabilizing foundation for devices which support heavy loads, including heavy equipment such as truck mounted or similar self-propelled devices, construction equipment, cranes, utility trucks and tree care vehicles, recreational vehicles, trailers or the like, where a jack, outrigger or similar support device provides temporary support extending from the main structure. Such devices are then stabilized by use of a mat. Equipment may rest on a mat to disperse the weight over a larger surface area. The stabilizer arm and/or platform and/or jack rests on a mat. This prevents the stabilizer arm or jack from breaking through the ground surface, whether soil, asphalt, or concrete and prevents damage to the stabilizer arm or jack. The mat prevents movement of the support while stabilizing the support and preventing tipping or rolling over of the equipment. A mat generally has a top surface on which the support device rests and a bottom surface in contact with the ground surface.

Improving the safety of lifting systems remains an area of interest. Some existing systems have various shortcomings relative to certain applications. Specifically, existing technology requires workers to individually place outrigger support mats. With typical crane mats weighing hundreds of pounds, this type of activity may take a long time, requires crane movement back and forth, and presents a certain amount of safety risk in the industry. Accordingly, there remains a need for further contributions in this area of technology.

SUMMARY

According to one aspect, a crane mat is provided having a top surface and a bottom surface. The top surface and the bottom surface are joined by one or more sidewalls, and two or more lifting portions recessed in the one or more sides. Each of the lifting portions include an arm with a proximal end attached to a recessed wall of the crane mat and a distal end attached to a plate.

According to another aspect, a crane mat is provided having a horizontal top surface and a horizontal bottom surface of the crane mat joined by a plurality of vertical plates, wherein two lifting portions are disposed on opposite sides of the crane mat, each of the lifting portions comprising an arm that extends outwardly from the crane mat.

According to another aspect, a method of lifting a plurality of mats A method of lifting a plurality of crane mats comprising the steps of: providing an upper crane mat and a lower crane mat, each crane mat having a top surface and a bottom surface joined by one or more sidewalls, wherein two lifting portions are each located on a respective recessed wall of each crane mat, wherein each of the two lifting portions comprise an arm having a proximal end that is attached to the respective recessed wall and distal end that is attached to a plate; retaining the lifting portions of the upper and lower crane mats with a sling; and lifting the upper and lower crane mats.

BRIEF DESCRIPTION OF THE DRAWINGS

FIG. 2 depicts a perspective view of the mat of FIG. 1.
FIG. 3 depicts a perspective view of a stack of mats.
FIG. 10 depicts a partial cut-away side view of the lifting portion of the mat.
FIG. 11 depicts a front perspective view of the lifting portion of the mat.

DETAILED DESCRIPTION

Figure 1:
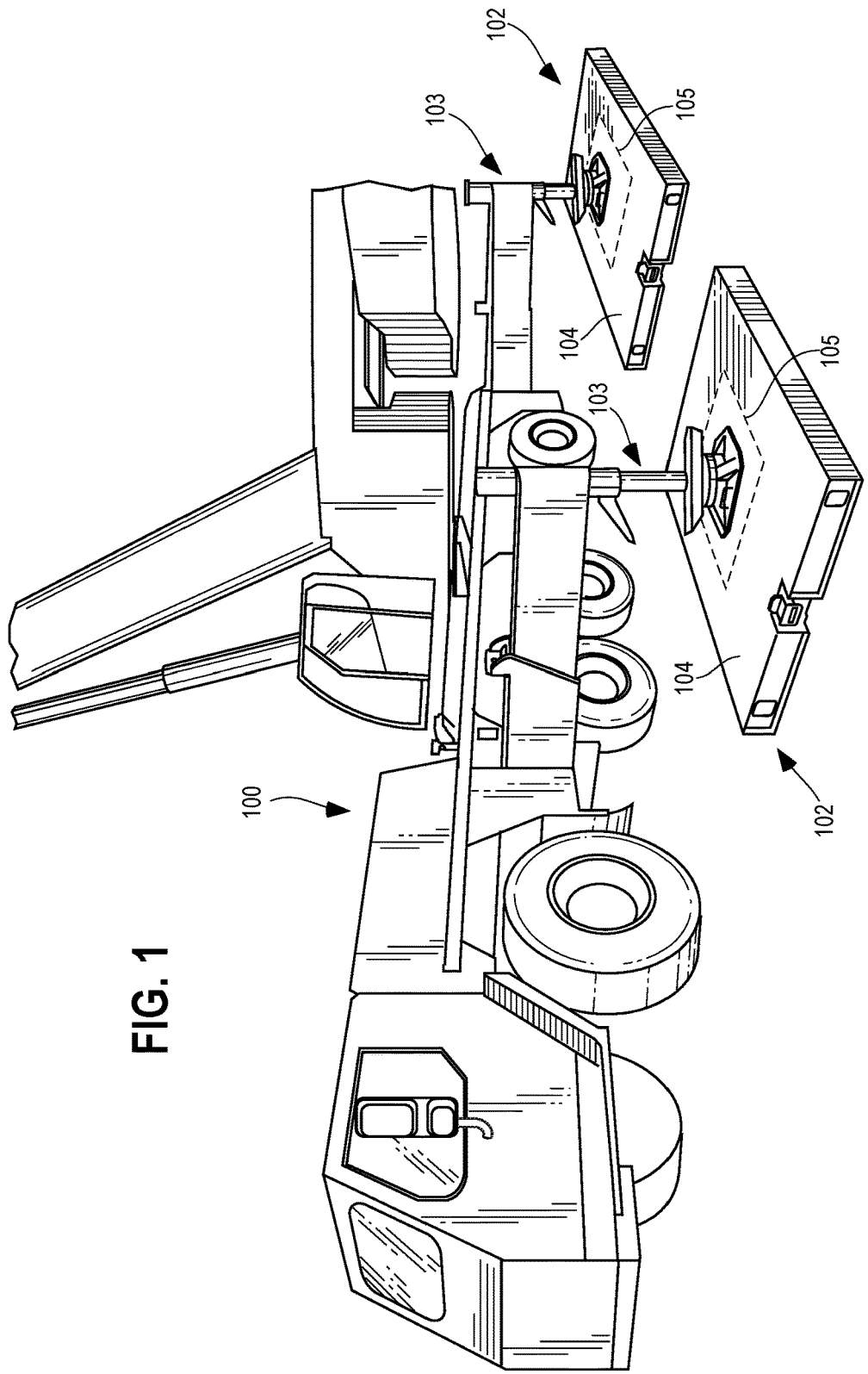
FIG. 1 depicts a perspective view of a crane having an outrigger and an embodiment of a mat.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles as described herein are contemplated as would normally occur to one skilled in the art to which the subject matter of the disclosure relates.

In many instances it may be necessary to remove and/or reposition crane mats before and after a lift. It is possible to minimize situations in which workers are required to manipulate the crane in order to move mats around a jobsite. Less time dedicated to moving crane mats will increase safety and result in a more efficient process of crane operation.

Referring to FIG. 1, a crane 100 is shown having a plurality of outriggers 103 extending outwardly that are seated on mats 102. The crane mats 102 distribute the weight of the crane onto a larger area than the crane outrigger feet 103. Each outrigger 103 has a float that is positioned on the center portion 105 of the top surface 104 of a mat 102.

Referring to FIG. 2, a perspective view of a mat 102 is shown. The mats of the illustrated embodiment are square and have a top surface 104, a bottom surface 106, two lifting portions 108, and four sides 110. The mats are constructed of a high strength material such as 0.25 inch carbon steel plate. Additional thicknesses include 0.5" and 0.375". The steel alloy can be A514 (T-1). The steel plates are welded together to form a strong yet relatively lightweight structure. Preferably, the crane mats are capable of supporting more than 100,000 pounds. The mat of the example embodiment weighs approximately 1,300 pounds and is rated to support up to 370,000 pounds.

A center portion 105 of the top surface 104 marks the optimal location for positioning an outrigger float (in the center of the mat) and measures approximately 4'×4' in the illustrated embodiment. The center portion is shown as a raised piece of steel in FIG. 2, however the center portion may also be unmarked as in FIG. 5.

The center portion 105 may be marked with bright colors, reflective tape, or may comprise a raised surface such as checkerboard to mark the area where the outrigger float is to be placed.

Although the mat shown illustrated embodiment is a 6'×6' square (weighing 1,375 lbs., rated to support 370,000 lbs.), other mat shapes are contemplated. The mat may be rectangular: 6'×8' (weighing 1,750 lbs., rated to support 370,000 lbs.) or 6'×10', or 6'×10' (weighing 2,400 lbs., rated to support 430,000 lbs.).

The crane mat is preferably symmetrical. In the illustrated embodiment, the lifting portions 108 are mounted on opposite sides of the crane mat. The centerline 107 illustrates the symmetrical nature of the mat 102 and the placement of the lifting portions 108 on opposite positions in relation to the centerline 107. For example, the mat may be some other symmetrical shape or polygon such as a hexagon, or an octagon. The mat could be round or rectilinear. Similarly, other materials of construction are contemplated. Although the illustrated embodiment is constructed of carbon steel which is painted to resist corrosion, other materials such as steel alloys or polymers are contemplated.

Referring to FIG. 3, a stack 111 of mats (102*a-d*) is shown. The stack 111 is lifted by a crane hook or spreader (not shown) using a sling 112. The sling 112 is an endless loop constructed of high strength nylon, also known as a nylon lifting sling. Typical lifting slings are a continuous loop of polyester load bearing yarn with a double layer seamless woven jacket for protection. The lifted load is supported by the internal yarn, which is protected from wear by the outer double jacket.

The sling 112 engages each mat (also shown in FIG. 8) in the stack 111. Since the lifting portions are vertically aligned the sling 112 is looped under the lifting portion 108*a* of the lowermost mat 102*a* and passes around the lifting portions 108*b-d* of the upper mats 102*b-d* such that the sling 112 is retained on either side of the lifting portions 108*b-d* of each upper mat 102*b-d* between the plate 118 and the recessed floor portions 129, 130 (see FIG. 6).

Figure 4:
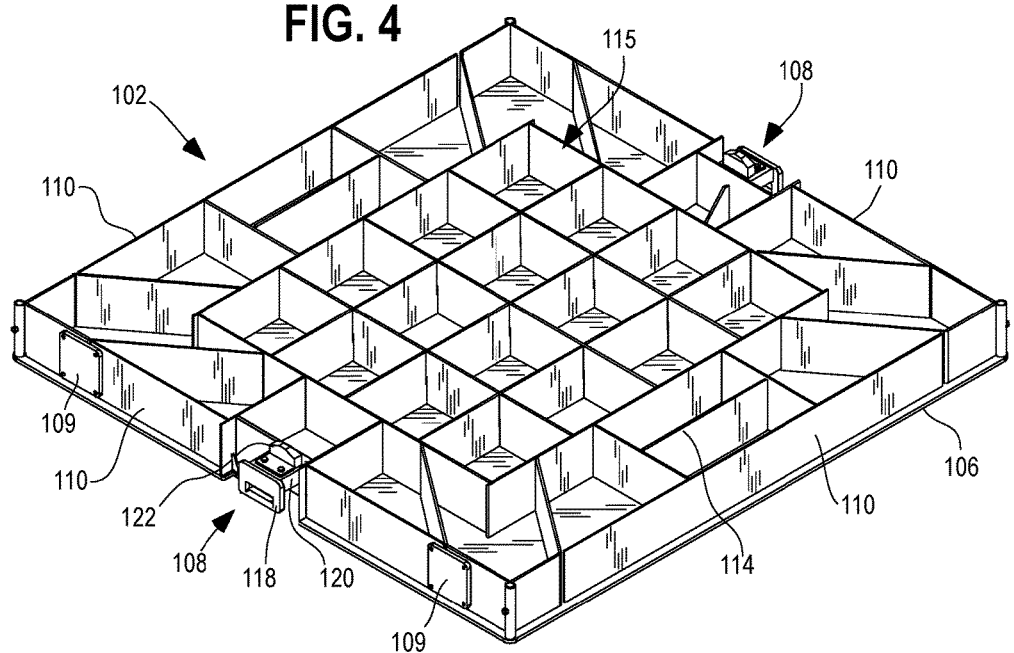
FIG. 4 depicts a perspective view of the mat without the top surface.

Referring to FIG. 4, a perspective view of the internal support structure of an embodiment of a crane mat 102 is shown. In the illustrated embodiment, the top surface (not shown) of the mat 102 is removed showing a grid pattern that provides strength and rigidity. A plurality of vertical supports 114 are arranged in a geometric pattern and form sixteen squares 115 in the center of the mat and form a central support structure. Other vertical supports are mounted at angles at the perimeter of the grid and join the central support structure to the sidewalls 110 of the mat. The support structures extend between the top surface 104 and the bottom surface 106 of the mat and are welded in place. Two mounting pads 109 comprising four bolt holes are mounted on the sidewall 110 on either side of the lifting portion 108. Pads 109 are useful for attaching lifting equipment (e.g., lifting lugs, D-rings, and the like) to the sidewall 110.

Figure 5:
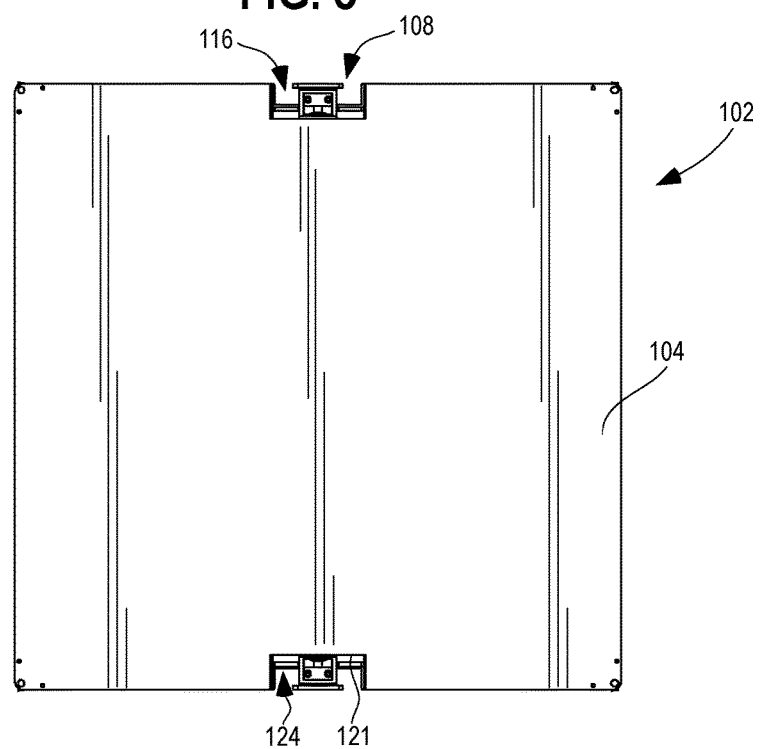
FIG. 5 depicts a top view of a mat.

Referring to FIG. 5, a top view of an embodiment of a mat 102 is shown. The mat 102 is substantially square and has two lifting points 108 that are located on opposite parallel sides of the mat 102. The top surface 104 of the mat has a recessed edge 121 where the lifting points 108 are located on recessed walls 124 and extend outward but do not extend beyond the sides of the top surface 104 of the mat 102. Recesses 116 (see FIG. 6) are configured to accept and retain the sling 112 (not shown) and are formed on either side of the arm of the lifting point 108 between the arm of the lifting portion and each recessed sidewall.

Figure 6:
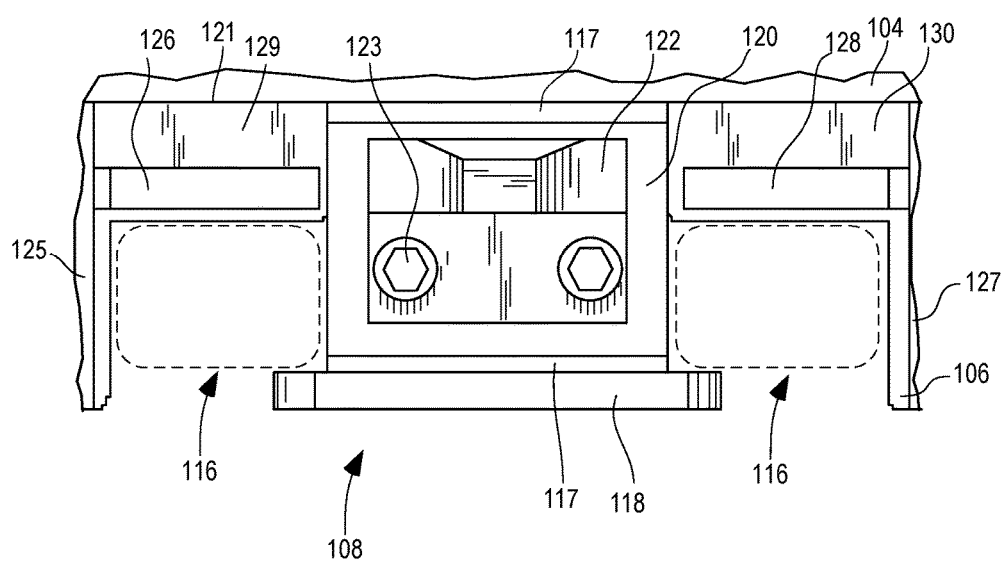
FIG. 6 depicts a top view of the lifting portion of the mat of FIG. 5.

Referring to FIG. 6, a top view of the lifting portion 108 is shown. The lifting portion 108 is located on the recessed wall (not shown) and extends outward between two recess sidewalls 125, 127. Two recesses 116 are formed between the arm 120 and the recessed side walls 125, 127 and between the plate 118 and the recessed floor portions 129, 130. When a stack of crane mats are vertically aligned, the recesses allow for the sling (not shown) to be positioned around the arms (between the plate and the recessed floor portions 129, 130) of multiple mats at a time. This allows for lifting a stack of mats using a single sling.

The proximal end of the arm 120 is welded 117 to the recessed edge 121 of the top surface 104 and the recessed wall 124 (not shown) of the mat 102. Likewise the distal end of the arm 120 is welded 117 to the plate 118. The protrusion 122 is mounted to the arm 120 via two bolts 123. In the illustrated embodiment, the protrusion 122 is bolted to the arm 120 such that it is removable. Alternatively, the protrusion 122 may be welded to the arm 120 or may be formed integrally with the arm as one piece. The recessed floor portions 129, 130 are joined to the recessed side walls 125, 127 by recessed side supports 126, 128.

Figure 7:
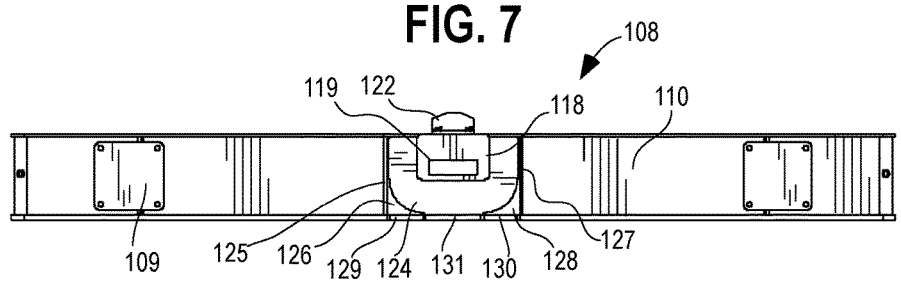
FIG. 7 depicts a side view of a mat.

Referring to FIG. 7, a side view of the crane mat 102 shows the lifting portion 108 on one sidewall 110 of the mat 102. Two mounting pads 109 are located on the sidewall 110 of the mat 102. At each lifting portion 108, the bottom surface 106 of the mat 102 has a recessed floor cutout 131 that is positioned directly below the protrusion 122. The bottom surface 106 of the mat forms a recessed floor cutout 131 that is defined by two recessed floor portions 129, 130 that extend out from the recessed wall 124 and the recessed side walls 125, 127. The plate 118 includes a handle 119 that is useful for guiding a mat 102 into place by hand on a job site.

Figure 8:
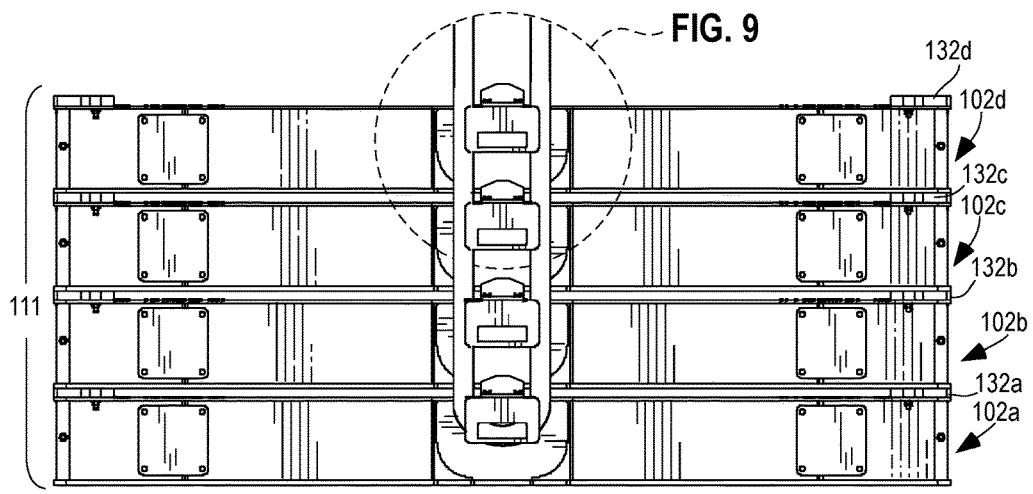
FIG. 8 depicts a side view of a stack of mats.

Referring to FIG. 8, a side view of a stack 111 of mats 102*a-d* is shown. The sling 112 may be used to lift an entire stack 111 of crane mats at once. As will be shown in greater detail (see FIG. 9), the protrusions 122 on each of the lower crane mats 102*a*-102*c* are nested within the recessed floor cut outs 131 of each of the upper mats 102*b-d*. Additionally, the sling 112 may be removed from the lowermost mat 102*a* and used to lift the remaining mats 102*b-d* to another location. Each mat 102*a-d* may optionally have a plurality of spacers 132*a-d* disposed at each corner on the top surface of the mat 102*d*. These spacers 132 are made of plastic (or steel) and provide a contact surface between the top surface and bottom surface of adjacent steel mats 102 when they are stacked. These spacers also decrease the tendency of the mats to slide against one another when wet.

FIG. 8 shows the nested arrangement of the mats 102*a-d*. Specifically, the protrusion 122*c* of a lower mat 102*c* is nested in the bottom recess 131 of an upper mat 102*d* (see FIG. 9). As stated above, the sling 112 fits around the arm 120 of each mat. In particular, the sling 112 is positioned such that it contacts the underside of the arm 120 of the lifting portion 108*a* of the lowermost mat 102*a* and on either side of the lifting points 108*b-d* of the upper mats 102*b-d*.

Lifting a stack 111 of mats is stable because the upward protrusions of the lowermost mats are nested within the recessed portion of the uppermost mats. Further the lifting portions of all of the mats in the stack are retained by the sling. These features keep the stack of mats together such that the mats do not shift past one another and the load does not become unstable when lifted or during transit. The ability for a crane to lift the mats with a sling is beneficial because slings are used when lifting counterweights. As such, lifting crane mats with slings would not require the crane to change the configuration of the lifting equipment.

Figure 9:
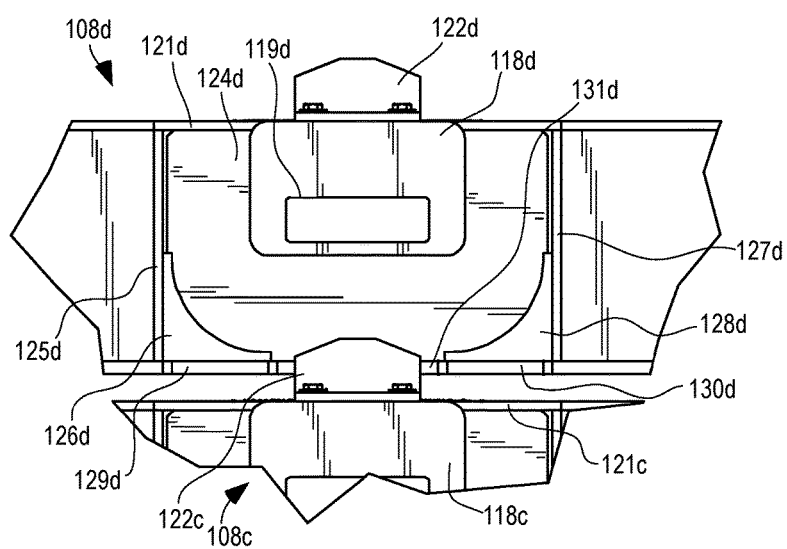
FIG. 9 depicts a side view of the stack of mats of FIG. 8.

Referring to FIG. 9, the lifting portion 108d of the uppermost mat 102d is shown as the uppermost mat 102d is stacked upon a lower mat 102c. The protrusion 122c of lifting portion 108c of a lower mat 102c is nested in the recessed floor cutout 131d of the upper mat 102d.

Referring to FIG. 10, a partial cutaway of the arm 120 is shown. The top surface 104 and the bottom surface 106 of the mat 102 define a height 134 of preferably between 5 inches and 8 inches. In the illustrated embodiment, the height 134 is approximately 6.5 inches. The midline 135 of the mat 102 is equidistant from the top surface 104 and the bottom surface 106 and acts as a rough approximation of vertical location of the mat's center of mass. The arm 120 may be attached substantially higher (approximately 1-2 inches) 140 from the midline 135 of the mat. In the illustrated embodiment, the arm 120 is a solid piece of steel that has a 45° chamfer and is mounted approximately one inch above the midline 135. This feature allows the center of mass of the mat to be substantially below the lifting point. This allows single mats to be lifted using a two point lifting arrangement that is inherently stable.

The protrusion 122 is approximately 3.5 inches wide 136 and 1.75 inches tall 142. The protrusion has a 0.5 inch chamfer 144 to allow it to slide against the recessed floor portions 129, 130 of an adjacent mat in the event that the mats in a stack are not aligned properly. The recessed floor cutout 131 is approximately 4.5 inches wide 138.

Referring to FIG. 11, a front perspective view of the lifting portion 108 is shown. The proximal end of the arm 120 is welded 117 to the edge 121 of the top surface 104 and the recessed wall 124. In the illustrated embodiment, the protrusion 122 is secured to the arm 120 using two bolts 123. The plate 118 includes a handle 119 and is welded to the distal end of the arm 120. The recessed side supports 126, 128 are welded to the recessed side walls 125, 127 and recessed floor portions 129, 130 to provide rigidity, as these surfaces typically can come into contact with the protrusions 122 when a mat 102 is stacked on top of another mat 102.

Figure 12:
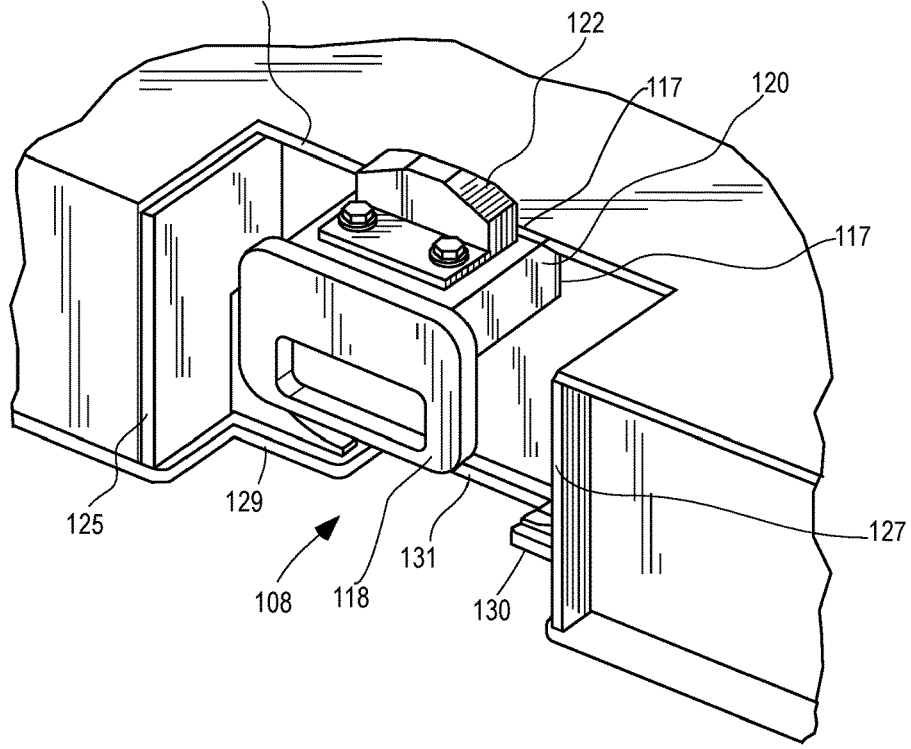
FIG. 12 depicts a perspective view of the lifting portion of the mat.

Referring to FIG. 12, a perspective view of the lifting portion 108 shows the rectilinear contours of the bottom surface 106 of the mat 102 that forms the recessed floor portions 129, 130 and the recessed floor cutout 131.

Figure 13:
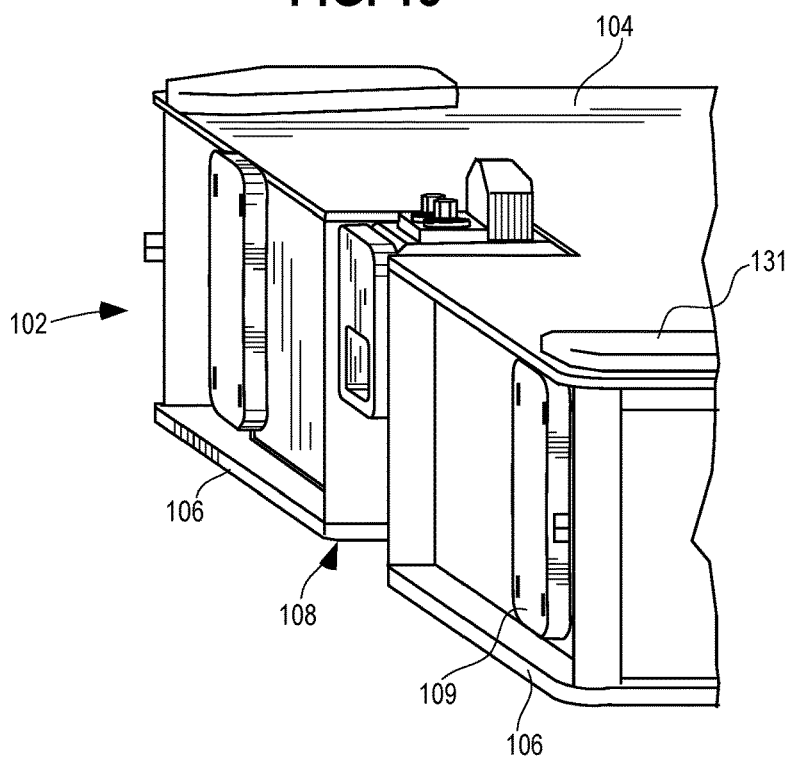
FIG. 13 depicts a side perspective view of the mat.

Referring to FIG. 13, a side perspective view of a sidewall 110 of the mat 102 is shown. The arm 120 and the plate 118 of the lifting portion 108 do not extend laterally beyond the top surface 104 and the recessed side walls 125, 127 of the mat 102. The recessed lifting points 108 minimize trip hazards on a job site. Similarly, the protrusion 122 may be removed when the mat is in service to minimize trip hazards in high traffic areas.

Figure 14:
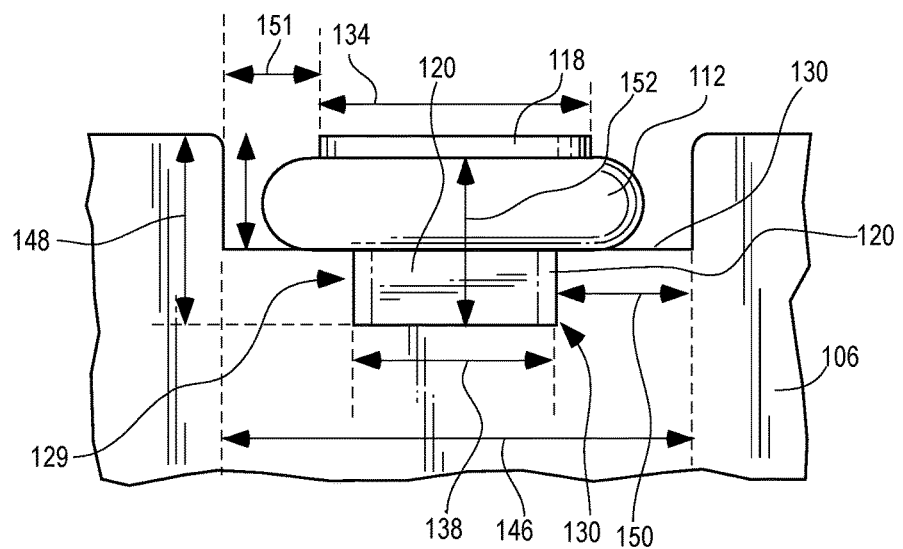
FIG. 14 depicts a bottom view of the lifting portion of the mat.

Referring to FIG. 14, a bottom view of the lifting portion 108 in this example embodiment shows the bottom surface 106 of the mat 102 that forms the recessed floor portions 129, 130. The width 146 of the lifting portion 108 (i.e., the distance from one recessed sidewall 125 to the other recessed sidewall 127) may be approximately 9 inches in this example. The width 138 of the recessed floor cutout 131 may be approximately 4.5 inches in this example. The depth of the lifting portion 148 (i.e. the distance from the recessed wall 124 or recessed floor cutout 131 to the edge of the plate 118 or bottom surface 106) may be approximately 4 inches in this example. The depth 149 of each recessed floor portion 129, 130 may be approximately 1.5 inches and the width 150 of each recessed floor portion 129, 130 may be approximately 2.25 inches in this embodiment. The width 134 of the plate 118 may be approximately 5 inches, and the width 151 of the gap on either side of the plate (i.e. the distance from the plate 118 to each recessed sidewall 125, 127) may be approximately 2 inches in this example. The length 152 of the arm 120 may be approximately 3.75 inches in this example embodiment.

Figure 15:
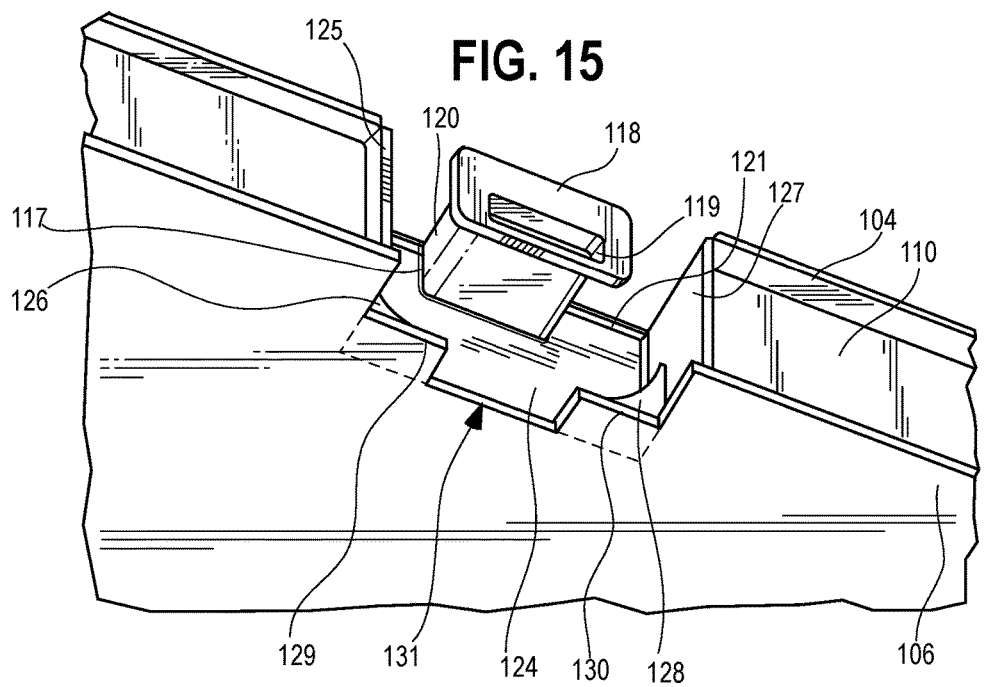
FIG. 15 depicts a bottom perspective view of the lifting portion of the mat.

Referring to FIG. 15, a bottom perspective view of the lifting portion 108 is shown. The top surface 104 and the bottom surface 106 of the mat 102 extend outward past the sidewall 110. The arm 120 extends outwardly from the recessed wall 124. The recessed support portion 126 is welded to the recessed sidewall 125 and the recessed floor portion 129 formed by the bottom surface 106 of the mat 102. Likewise, the recessed support portion 128 is welded to the recessed sidewall 127 and the recessed floor portion 130 formed by the bottom surface 106 of the mat 102.

The embodiment(s) detailed above may be combined, in full or in part, with any alternative embodiment(s) described.

INDUSTRIAL APPLICABILITY

Important advantages of the crane mat system include two-point lifting via lifting portions that each include an arm and a plate such that a sling may retain the vertically aligned lifting portions of a stack of crane mats and lift them at once. Another important advantage of the crane mats is that they nest within one another such that they do not slide during a lift or during transit. Another important advantage of the crane mats is that the lifting portions to not protrude laterally beyond the top surface and the bottom surface and do not cause a trip hazard.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Various embodiments of this disclosure are described herein, including the best mode known to the inventors for carrying out the disclosure. It should be understood that the illustrated embodiments are exemplary only, and should not be taken as limiting the scope of the disclosure.

I claim:

1. A crane mat comprising:
   a top surface and a bottom surface wherein the top surface and the bottom surface are joined by one or more sides; and
   two or more lifting portions recessed in the one or more sides, each lifting portion comprising an arm having a proximal end attached to a recessed vertical sidewall of the crane mat and a distal end attached to a plate.

2. The crane mat of claim 1, wherein the crane mat has a midline that bisects the crane mat horizontally, the midline is equidistant from the top surface and the bottom surface of the mat, and wherein each of the two or more lifting portions is mounted to the crane mat above the midline.

3. The crane mat of claim 2, wherein the plate of each lifting portion is welded to the arm and includes a handle.

4. The crane mat of claim 2, wherein each lifting portion comprises a protrusion attached to the arm, wherein the protrusion extends above the top surface of the crane mat.

5. The crane mat of claim 4 wherein each protrusion is bolted to a respective arm.

6. A crane mat comprising:
   a top surface and a bottom surface wherein the top surface and the bottom surface are joined by one or more sides; and
   two or more lifting portions recessed in the one or more sides, each lifting portion comprising an arm having a proximal end attached to a recessed wall of the crane mat and a distal end attached to a plate, wherein the plate of each lifting portion is welded to the arm and includes a handle, wherein each lifting portion comprises a protrusion attached to the arm, wherein the protrusion extends above the top surface of the crane mat, wherein the bottom surface of the crane mat includes a cutout located below the protrusion, and wherein the crane mat may be stacked on a further crane mat such that the cutout is shaped to receive a further protrusion of the further crane mat.

7. The crane mat of claim 1, wherein the crane mat has four sides, and wherein the lifting portions are located on opposite parallel sides.

8. The crane mat of claim 7, wherein the lifting portions are located between further recessed sidewalls on either side of the arm such that gaps are formed between the arm and the further recessed sidewalls.

9. A crane mat comprising:
   a horizontal top surface and a horizontal bottom surface of the crane mat joined by a plurality of vertical plates, wherein two lifting portions are disposed on opposite sides of the crane mat, individual ones of the lifting portions comprising an arm that extends outwardly from a recessed vertical sidewall of the crane mat.

10. The crane mat of claim 9, further comprising a protrusion that extends above the top surface of the crane mat.

11. A crane mat comprising:
    a horizontal top surface and a horizontal bottom surface of the crane mat joined by a plurality of vertical plates, wherein two lifting portions are disposed on opposite sides of the crane mat, each of the lifting portions comprising an arm that extends outwardly from the crane mat, and wherein each arm of each lifting portion is welded to a recessed sidewall, and wherein the bottom surface of the crane mat comprises recessed floor portions.

12. The crane mat of claim 9, wherein the crane mat defines a height and a midline that extends horizontally along a midpoint between the top surface and the bottom surface, and wherein the arm of each lifting portion is disposed on the crane mat above the midline.

13. The crane mat of claim 10 wherein the arm is mounted to a plate, wherein the plate comprises a handle.

14. The crane mat of claim 11, wherein the crane mat is rectangular in shape and constructed of steel, such that the crane mat is capable of supporting more than 100,000 pounds.

15. The crane mat of claim 14, wherein the recessed floor portions are rectilinear in shape, wherein the recessed floor portions are welded to further recessed sidewalls.

* * * * *